O. M. MOWAT.
RECESSING MACHINE.
APPLICATION FILED APR. 18, 1907.

932,407.

Patented Aug. 24, 1909.
4 SHEETS—SHEET 2.

WITNESSES
R A Balderson
W W Swartz

INVENTOR
O. M. Mowat.
by Bakewell & Byrnes
his attys.

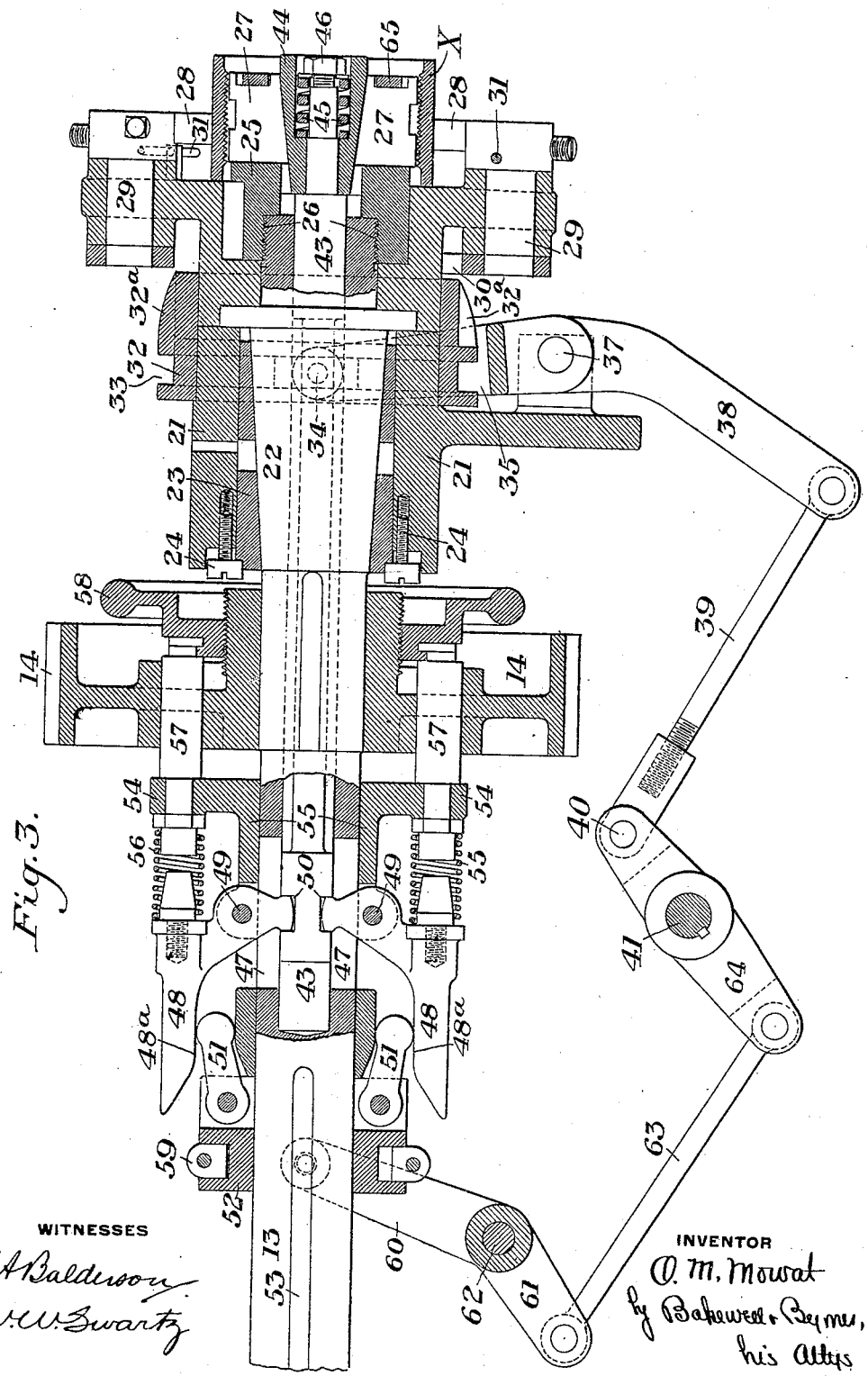

O. M. MOWAT.
RECESSING MACHINE.
APPLICATION FILED APR. 18, 1907.
932,407.
Patented Aug. 24, 1909.
4 SHEETS—SHEET 4.
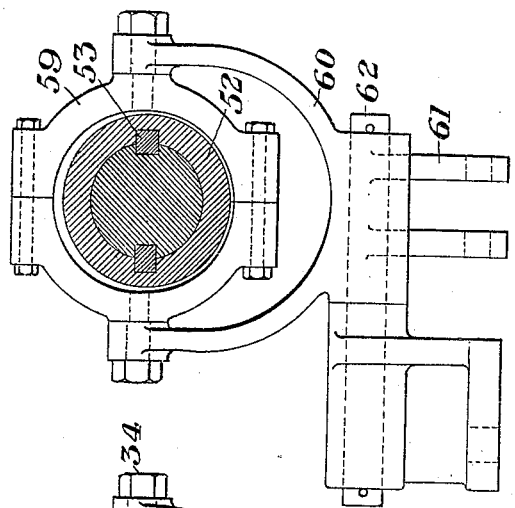
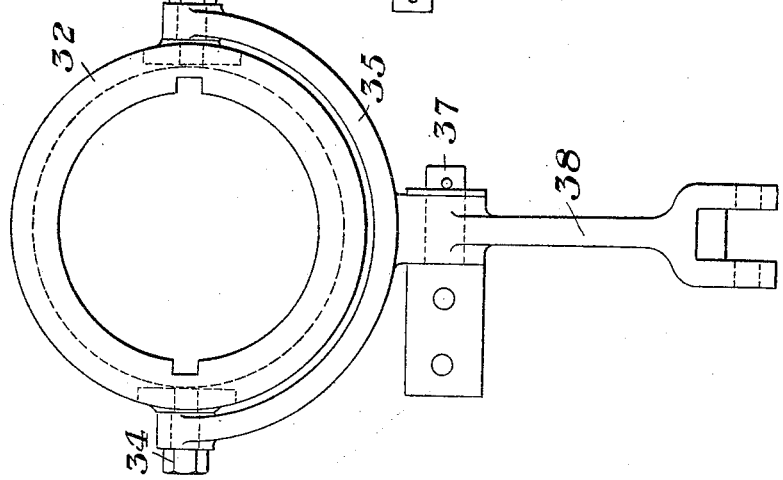
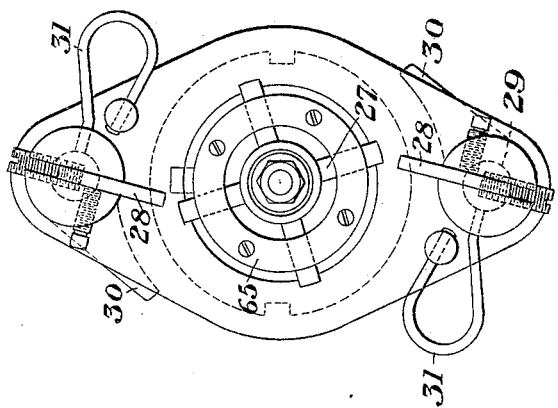
WITNESSES
R A Balderson
W W Swartz
INVENTOR
O. M. Mowat,
by Bakewell & Byrnes
his Attys.

UNITED STATES PATENT OFFICE.

OLIVER M. MOWAT, OF McKEESPORT, PENNSYLVANIA, ASSIGNOR TO NATIONAL TUBE COMPANY, OF PITTSBURG, PENNSYLVANIA, A CORPORATION OF NEW JERSEY.

RECESSING-MACHINE.

932,407.      Specification of Letters Patent.      Patented Aug. 24, 1909.

Application filed April 18, 1907. Serial No. 368,995.

*To all whom it may concern:*

Be it known that I, OLIVER M. MOWAT, of McKeesport, Allegheny county, Pennsylvania, have invented a new and useful Recessing-Machine, of which the following is a full, clear, and exact description, reference being had to the accompanying drawings, forming part of this specification, in which—

Figure 1:
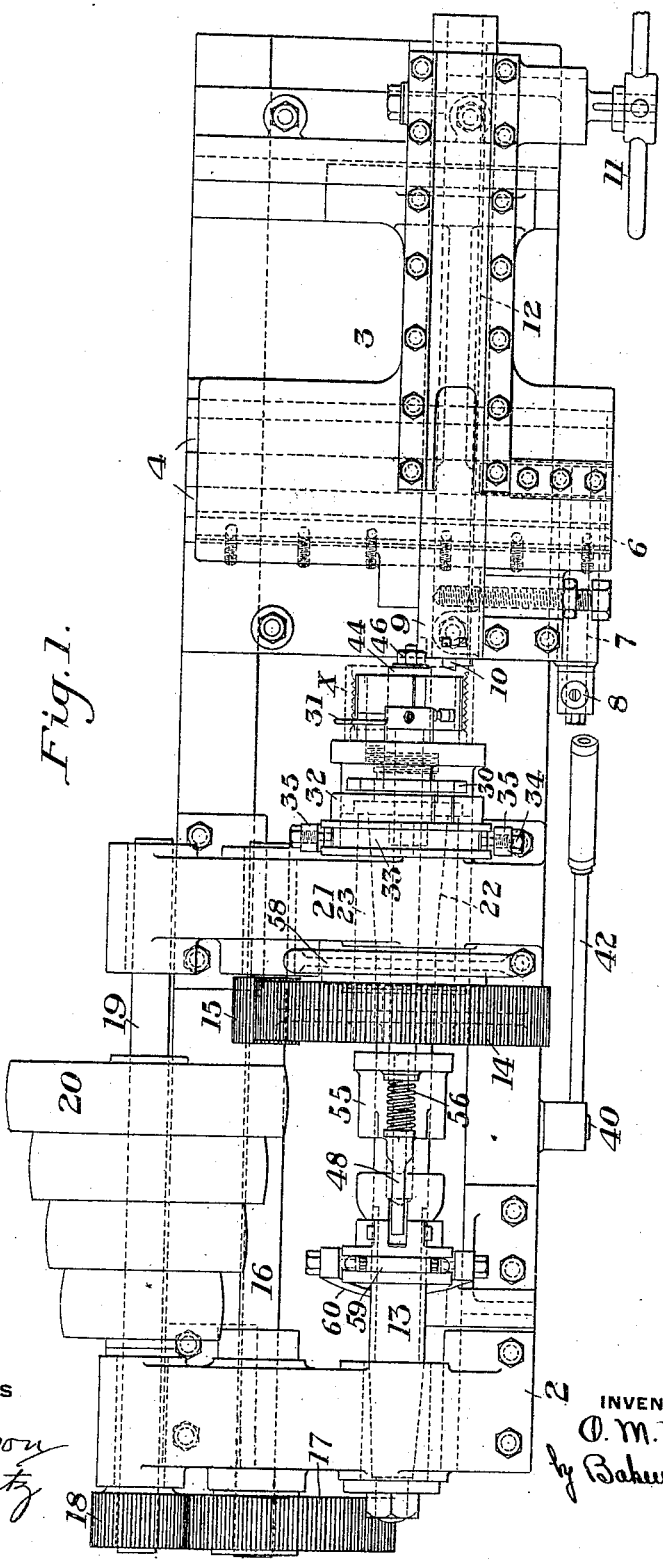
Figure 2:
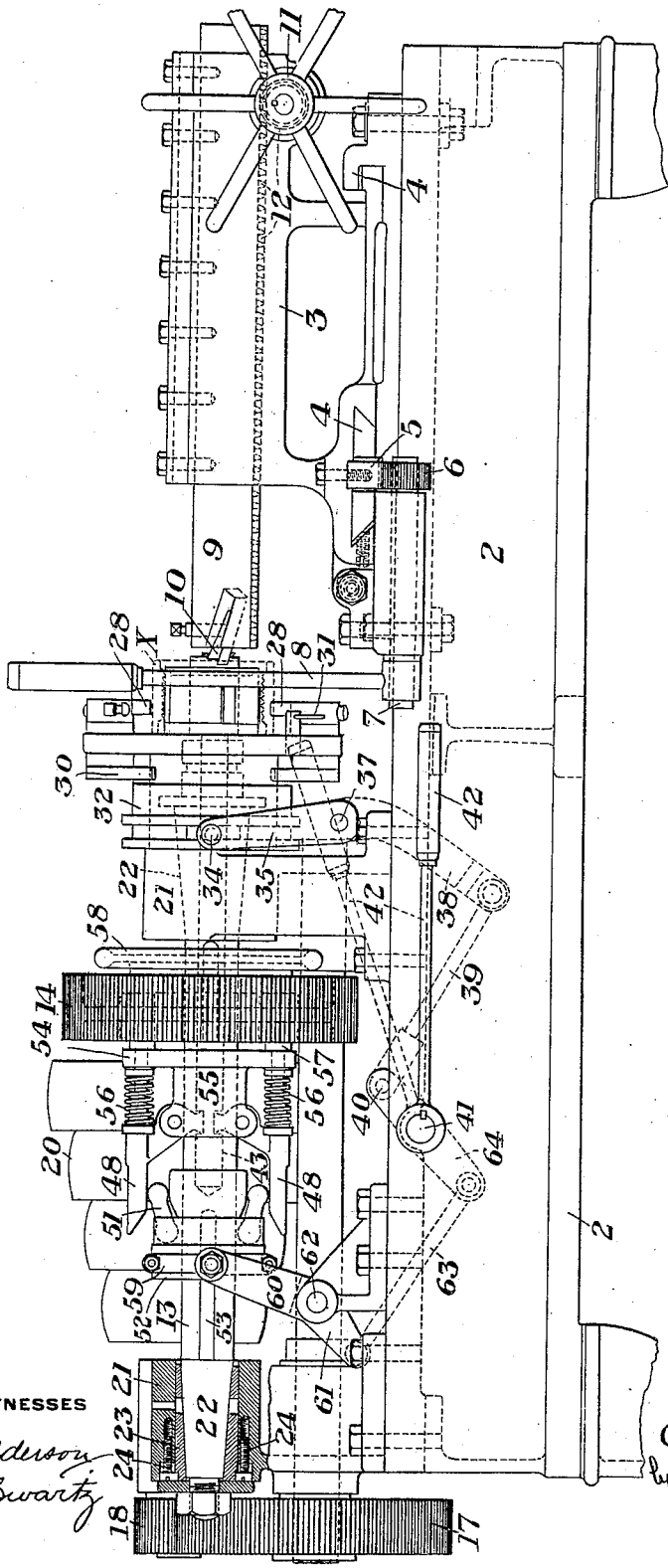

Figure 1 is a plan view of a machine embodying my invention; Fig. 2 is a side view of the same; Fig. 3 is a vertical section on a larger scale showing the main spindle, chuck, and adjacent parts, with a coupling in place thereon; Fig. 4 is an end view of the same; and Figs. 5 and 6 are detail views showing respectively the means for actuating the collar which operates the centering jaws, and the collar which operates the holding jaws or dogs.

My invention relates to apparatus used in finishing pipe couplings and similar articeles, and the object of my invention is to provide improved mechanism by means of which such articles may be recessed or finished after they have been interiorily threaded without injuring the threads; also to provide means whereby this work may be rapidly and efficiently performed; and to provide for adjustment whereby the same machine may be used with couplings or other articles of different diameters.

With these objects in view, my invention consists in the provisions of a novel form of chuck for holding and centering the articles to be recessed or finished, and in the novel means for operating and adjusting the same.

My invention also consists in the novel construction, arrangement and combination of parts all substantially as hereinafter described.

In the drawings, the numeral 2 designates the bed of the machine, upon which is mounted a tool-holding slide or carriage 3 mounted for transverse movement on the guides 4.

5 is a rack bar, which is engaged by pinion 6 on a shaft 7 having an operating lever 8. By the movement of this lever the tool slide or carriage may be moved transversely.

9 is the tool-holding bar carrying a tool 10. This bar is mounted for longitudinal movement in the sliding carriage 3, and is actuated by hand wheel 11 through a rack and pinion 12, or in any other suitable way, these parts having nothing to do with my present invention.

13 designates the main spindle of the machine, which is driven by a gear wheel 14, whose teeth are engaged by a pinion 15 on a shaft 16. The shaft 16 is driven by gear 17 and pinion 18 from a shaft 19 carrying a step driving pulley 20. The main spindle 13 is supported in the bearings 21, the shaft having tapered or cone portions 22 within said bearings and turning in the interiorily tapered bushing 23. These bushings are adjustable to take up wear by means of screws 24.

25 designates a chuck, which is threaded or otherwise secured to the forward end of the spindle 13, as indicated at 26, (Fig. 3). Seated within this chuck are a series of radially movable jaws 27, which are designed to be moved radially outward for the purpose of engaging the threaded interior of the coupling to be finished, (shown at X in Fig. 3) and thereby center said coupling. The coupling is gripped and rotated by means of the dogs 28, which engage its exterior surface at diametrically opposite points. These dogs are secured to rock shafts or pins 29, which are journaled in extensions of the chuck and are provided at their rear ends with depending arms 30. A spring 31 is connected to each of the shafts or pins 29 and to the chuck, the tension of said spring being such as to tend to throw the dogs 28 into gripping engagement with the coupling. To release the dogs from such engagement, I provide a sliding collar or sleeve 32 having lugs 32ª, which, when the collar is moved forwardly from the position shown in Fig. 3, will ride underneath the arms 30, and thereby raise them and rock the dogs 28 away from the coupling. The sleeve 32 is actuated by means of a collar 33, which is engaged by pins 34 of a forked lever 35, (Fig. 6), which is fulcrumed at 37 and has a depending arm 38 connected by an adjustable rod or link 39 with an arm 40 of a rock shaft 41, to which is secured an operating lever 42. The normal position of the lever 42 is shown in dotted lines in Fig. 2, and when this lever is depressed to the position shown in full lines in said figure, the connections 39 and 40 are actuated to thereby retract the sleeve 32 into the position shown in Fig. 3. The springs then cause the dogs 28 to grip the coupling X, which is then rotated with the chuck.

The centering jaws 27 are actuated by the following means:—Slidably seated in the main spindle 13, and projecting beyond the forward end of the same into the chuck, is a rod or shaft 43 having a cone-shaped or beveled head 44, against the outer beveled surface of which the inner beveled edges of the centering jaws 27 seat. This head 44 is secured to the rod or shaft 43 through the medium of the spring 45 and nut 46. The main spindle 13 is slotted as shown at 47, to receive the short arms of dogs 48, which are pivoted at 49, said arms engaging recesses 50 in the rod or shaft 43. The longer arms of the levers 48 extend rearwardly, and have inner approximately straight surfaces 48ª, which are engaged by dogs 51, which are pivoted to a block 52 arranged to slide longitudinally on splines or feathers 53 of the spindle 13. Interposed between the longer arms of the dogs 48 and the flange 54 of the part 55 to which the dogs 48 are pivoted, are spiral springs 56, which normally press upon the dogs 48 with a tendency to rock their longer arms inwardly against the dogs 51. The part 54 is made to slide longitudinally upon the main spindle 13, and is connected by the bars 57 with a hand wheel 58 which is threaded upon the hub or boss of the gear wheel 14, before described. The block or sleeve 52 is actuated by means of a collar 59, seated in a peripheral groove thereof and engaged by the forked arms 60 of a lever 61 fulcrumed at 62 and connected by link 63 with an arm 64 of the rock shaft 41, before described. When the hand lever 42 is actuated in the manner before described to effect the gripping action of the dogs 28, the same movement actuates the link 63 and lever 61 to thereby move the sleeve 52 forwardly on the spindle 13. This causes the dogs 51 to move under the longer arms of the dogs 48 into the position shown in Fig. 3, thereby rocking said dogs on the centers 49 to retract the rod or shaft 43. This movement of this rod or shaft forces the jaws 27 outwardly against the threaded interior surface of the coupling X, which is thereby held in a perfectly centered position. Owing to the provision of the spring 45, which provides a slight element of flexibility in the connection between the head 44 and the rod or shaft 43, a slight automatic adjustment of the jaws 27 is permitted to compensate for variations in the internal diameters of different couplings. By adjusting the hand wheel 58 to thereby advance or retract the dogs 48, a further and wider adjustment of the jaws 27 is permitted. This adjustment can be made while the machine is in motion. For larger variations in sizes of the work, the jaws 27 are removed, (by removing the securing ring 65), and substituting jaws of greater or less radial dimensions. The outer faces of these jaws which engage the threads are plane surfaces. This makes it possible to handle different styles of couplings with the same set of jaws, and even blank forgings can be recessed or finished. These jaws in no way injure the threads, it being found in practice that it is impossible to tell where they have been bearing against the threads. This is for the reason that they do not drive the coupling, but only act to center it.

The advantages of my invention result from the novel construction of chuck, having the exteriorly acting driving dogs, and the interiorly acting centering jaws, whereby the part to be recessed or finished is accurately centered so that the cut is made more exactly concentric with the axis of said part. A further advantage results from the arrangement by which the jaws can be readily adjusted to suit different styles or sizes of work; in the automatic adjustment to compensate for slight variations in the interior diameters of the work; and in the arrangement of the operating parts, whereby the movement of a single lever effects the operation of both the driving dogs and the centering jaws.

Various changes may be made in the details of the construction and arrangement of the parts without departing from the spirit and scope of my invention. Thus, the main spindle may be driven in various ways; and the actuating connections for the driving dogs and the centering jaws may be changed.

What I claim is:—

1. In a machine for recessing couplings and the like, a chuck comprising interior centering jaws having means for adjusting said jaws, and exterior gripping dogs having mechanism arranged to adjust the gripping dogs to secure the couplings in said dogs; substantially as described.

2. In a machine for recessing couplings and the like, a chuck comprising interior centering jaws having means for adjusting said jaws, exterior gripping dogs having mechanism arranged to adjust said gripping dogs, and means for simultaneously actuating the jaws and gripping dogs; substantially as described.

3. In a machine of the character described, a chuck having a rotary spindle, radially movable jaws on the chuck adapted to engage with and center the coupling relative to the spindle, and gripping jaws rotating with the chuck arranged to engage with and turn the couplings centered on the radially movable jaws; substantially as described.

4. In a machine for finishing hollow couplings and the like, a spindle, a chuck mounted thereon, a plurality of radially movable jaws on the chuck adapted to engage the inner surface of and center the couplings thereon, and independent means for holding the couplings against rotation relative to the chuck; substantially as described.

5. In a machine for finishing hollow couplings and the like, a shaft having a plurality of radially movable jaws arranged to engage the inner surface of the coupling, a sliding shaft having a longitudinally movable member for actuating said jaws, a spring interposed in the connection between said member and the sliding shaft for controlling the movement of said member on said sliding shaft, and means independent of the radially movable jaws arranged to grasp and hold the couplings in place; substantially as described.

6. In a machine for finishing hollow couplings and the like, a main spindle, a chuck driven thereby having a plurality of radially movable centering jaws, wedging faces for moving said jaws, a shaft movable longitudinally in the main spindle having a yielding engagement with said jaw moving wedges, levers engaging said shaft, yielding means for actuating said levers in one direction and positive means for actuating the levers in the opposite direction; substantially as described.

7. In a machine for recessing hollow couplings and the like, a main spindle, a chuck driven thereby, gripping dogs carried by the chuck and adapted to grip the exterior of the coupling, a plurality of radially moving centering jaws arranged to engage the inner surface of the couplings, a sliding member operatively connected to said dogs, a longitudinally movable member for actuating the jaws and a second sliding member operatively connected to said actuating member and means for simultaneously operating said sliding members; substantially as described.

8. In a machine for recessing hollow couplings and the like, a main spindle, a chuck driven thereby, movable dogs carried by the chuck for engagement with the exterior of the couplings, a plurality of radially movable jaws for engaging the interior of the coupling, actuating connections for the dogs and for the jaws, and a single lever for operating both sets of connections; substantially as described.

In testimony whereof, I have hereunto set my hand.

OLIVER M. MOWAT.

Witnesses:
RALPH E. PORTER,
J. T. ARMSTRONG.